Patented Nov. 19, 1940

2,221,882

UNITED STATES PATENT OFFICE 2,221,882

PROCESS OF PRODUCING AROMATIC ALCOHOLS

Louis T. Rosenberg, Ridgefield Park, N. J., assignor to National Oil Products Company, Harrison, N. J., a corporation of New Jersey No Drawing. Application July 27, 1938, Serial No. 221,635

10 Claims. (Cl. 260—618)

The invention relates in general to the hydrolysis of organic halides and in particular to a process of producing benzyl alcohol from benzyl chloride or other halide.

Benzyl alcohol and its substituted derivatives find use in various fields, such as in the manufacture of varnishes, dopes, lacquers and like coating or waterproofing compositions. Benzyl alcohol is also used as a starting material in the preparation of perfumes. Heretofore, benzyl alcohol has been produced by the hydrolysis of benzyl chloride according to various procedures. Generally hydrolysis has been carried out in the presence of an alkali or alkaline earth metal salts, such as calcium chloride, calcium carbonate, sodium carbonate and potassium carbonate. While these salts have aided in the hydrolysis of benzyl chloride, the rate of reaction has been entirely too slow, ranging from 10 to 24 hours. Moreover, this process was very costly inasmuch as it is necessary to heat the hydrolyzing mixture during this long time interval. Further, the ultimate yield has been much too low for commercial success. A yield of about 40% to 50% obtained according to the prior practices was considered high.

The general object of the invention is to obviate the foregoing and other disadvantages.

A specific object of the invention is to provide an improved process of producing benzyl alcohol by hydrolysis whereby the yield is materially increased.

Another object of the invention is to provide a new and improved process whereby benzyl chloride may be completely hydrolyzed within a relatively short period of time.

Other objects will in part be obvious and will in part appear hereinafter.

It has now been discovered that the foregoing and other objects may be realized by producing benzyl alcohol according to the process of the invention, which comprises treating a benzyl halide in the presence of heat with an aqueous solution of a weak alkaline substance and subsequently introducing a stronger alkaline substance and heating for a relatively short period of time. When hydrolysis has been completed, the benzyl alcohol may be recovered by decantation and/or distillation. The expression "benzyl halide" is used generically herein to include the benzyl halides and their substituted derivatives.

The invention accordingly comprises the several steps and the relation of one or more of such steps with respect to each of the others thereof, which will be exemplified in the process hereinafter disclosed, and the scope of the invention will be indicated in the claims.

In carrying out the process of the invention, any suitable benzyl halide, such as benzyl chloride, bromide, iodide or fluoride, or derivatives thereof may be used as a starting material. The halide may be in a crude or a partially or completely refined state. As examples of derivatives of the benzyl halides, the following may serve as illustrations: nitrobenzyl chloride, aminobenzyl chloride, an alkyl benzyl chloride, etc. While any suitable benzyl halide or derivative thereof may be used, the novel process is particularly adapted for the production of benzyl alcohol from benzyl chloride and this specie of the invention is highly preferred.

The hydrolyzing step may be carried out in any suitable apparatus according to known procedures. The most favorable results have been obtained by refluxing the halide with the aqueous alkaline solution. The hydrolyzing step is carried out in essentially two parts, the first including refluxing of benzyl chloride with an aqueous solution of a weak alkaline substance such as sodium carbonate, potassium carbonate or any other suitable weak alkaline compound. The second part of the hydrolyzing step occurs when the stronger alkaline substance is added after which refluxing is continued. Any suitable alkali may be added during the second part of the reaction, such as sodium hydroxide, potassium hydroxide or any other suitable alkali which will increase the yield of benzyl alcohol as well as cut down the refluxing time.

In preparing the initial mixture there is added to a given quantity of benzyl halide, an aqueous solution of the weak alkaline material containing approximately the stoichiometrical quantity of material to neutralize the hydrogen halide liberated during hydrolysis. For best results a slight excess over the stoichiometrical amount (about ½% to 5%) of alkaline material is used. This mixture is then refluxed for a period of about 1 to 4 hours, after which the stronger alkali is added in a preferably concentrated solution, whereupon refluxing is continued for about ½ to 1½ hours. The amount of alkali added may vary from about 4% to 36% of the stoichiometrical quantity necessary to neutralize all the hydrogen halide liberated during hydrolysis, best results having been obtained, however, by using an amount within the range of about 15% to 20% of the stoichiometrical quantity. When hydrolysis has been completed, the mixture is allowed to cool, whereupon two distinct layers form. The oily layer is separated from the aqueous layer, the latter being extracted with a suitable solvent. The oily liquid and the extracted solvent solution are admixed and the solvent recovered by distillation. The resulting benzyl alcohol may then be purified by distillation and/or by other known procedures.

For a fuller understanding of the nature and objects of the invention, reference should be had to the following examples which are given merely to further illustrate the invention and are not to be construed in a limiting sense, all parts given by weight:

Example I 100 parts of benzyl chloride and 430 parts of a 10% solution of sodium carbonate are admixed and refluxed for about 3 hours. 12.5 parts of a 45% sodium hydroxide solution are then added, whereupon the mixture is refluxed for an hour. The solution is then cooled and the oily layer (benzyl alcohol) is separated from the aqueous layer, the latter being extracted one or more times with a solvent such as benzol. The benzyl alcohol and benzol extractions are distilled to recover the benzol. In carrying out the above process, 88.5 parts of benzyl alcohol were recovered which amounts to a 98% yield.

Example II

Following the procedure of Example I using 25 parts of 45% NaOH in lieu of 12.5 parts, a yield of 92% of benzyl alcohol was obtained.

Example III

By using only 3.1 parts of 45% NaOH in the same procedure outlined in Example I, a yield of 91% benzyl alcohol resulted.

From the foregoing, it is apparent that the process of the invention is highly efficient both in the relatively short time in which hydrolysis is effected and in the unusually high yield obtained.

Since certain changes may be made in carrying out the above method without departing from the scope of the invention, it is intended that all matter contained in the above description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

Having described my invention, what I claim as new and desire to secure by Letters Patent is:

1. In a process of hydrolyzing a benzyl halide, the steps which comprise heating the halide in the presence of an aqueous solution of a weak alkaline substance and subsequently adding a stronger alkaline material thereto with continued heating.

2. In a process of hydrolyzing a benzyl halide, the steps which comprise heating the halide in the presence of an aqueous solution of an alkaline carbonate and subsequently adding a strong alkali thereto with continued heating.

3. In a process of hydrolyzing a benzyl halide, the steps which comprise heating the halide in the presence of an aqueous solution of sodium carbonate and subsequently adding sodium hydroxide thereto with continued heating.

4. A process of producing benzyl alcohol which comprises subjecting benzyl chloride to heat in the presence of an aqueous solution of a weak alkaline substance and subsequently adding a stronger alkaline material thereto with continued heating.

5. A process of producing benzyl alcohol which comprises subjecting benzyl chloride to heat in the presence of an aqueous solution of an alkaline carbonate and subsequently adding a strong alkali thereto with continued heating.

6. A process of producing benzyl alcohol which comprises subjecting benzyl chloride to heat in the presence of an aqueous solution of an alkali metal carbonate and subsequently adding a strong alkali thereto with continued heating.

7. A process of producing benzyl alcohol which comprises refluxing a mixture of benzyl chloride and an aqueous solution of alkali metal carbonate containing about the stoichiometrical quantity of carbonate to neutralize the HCl liberated during hydrolysis and subsequently introducing a strong alkali with continued refluxing.

8. A process according to claim 7 wherein the amount of carbonate used is slightly in excess of the stoichiometrical quantity.

9. A process according to claim 7 wherein the amount of alkali used is about 15% to 20% of the stoichiometrical quantity necessary to neutralize all the HCl liberated during hydrolysis.

10. A process of producing benzyl alcohol which comprises refluxing a mixture of benzyl chloride and an aqueous solution of sodium carbonate and subsequently adding sodium hydroxide thereto with continued refluxing.

LOUIS T. ROSENBERG.